April 18, 1933.  A. H. JOHNSON  1,903,925
TIRE BEAD REENFORCING ELEMENT
Filed Dec. 26, 1930
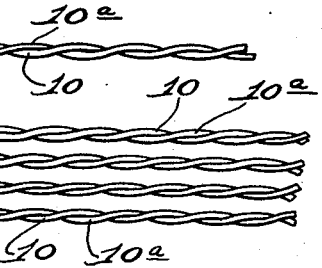
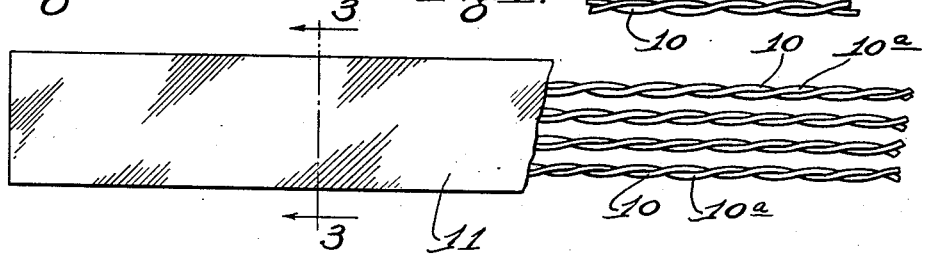
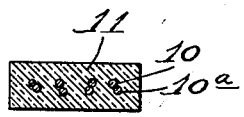
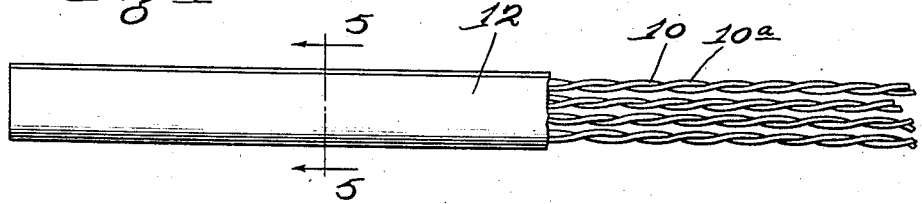
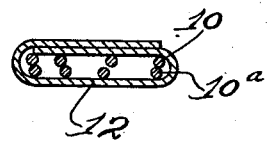
Inventor.
Alfred H. Johnson.
By Dyrenforth, Lee, Chritton & Wiles
Attys.

Patented Apr. 18, 1933

1,903,925

UNITED STATES PATENT OFFICE

ALFRED H. JOHNSON, OF NILES, MICHIGAN, ASSIGNOR TO NATIONAL-STANDARD COMPANY, OF NILES, MICHIGAN, A CORPORATION OF MICHIGAN

TIRE BEAD REENFORCING ELEMENT

Application filed December 28, 1930. Serial No. 504,927.

This invention relates to improvements in tire-bead reenforcing elements and, more especially, the tension member or members in such an element.

Among the features of my invention is the provision of a reenforcing element with a tension member to which the rubber of the bead will firmly adhere.

In the construction of tire-bead reenforcing elements heretofore, it has been the practice to use a wire or wires for the tension member or members. The principal feature of my invention is the employment of twisted, stranded or braided wires to form the tension members. I have found that such a twisted, stranded or braided wire will make a tension member to which the rubber of the tire bead will strongly adhere; and such twisted, stranded or braided member possesses a high degree of flexibility.

Other features and advantages of my invention will appear more fully as I proceed with my specification.

In that form of device embodying the features of my invention shown in the accompanying drawing—

Figure 1 is a view of a reenforcing element including a single tension member of twisted wires; Fig. 2 is a view of such an element formed of four tension members imbedded in a rubber tape; Fig. 3 is a view taken as indicated by the line 3—3 of Fig. 2; Fig. 4 is a view of a reenforcing element formed of four tension members inclosed in a fabric sheath; Fig. 5 is a view taken as indicated by the line 5—5 of Fig. 4; and Fig. 6 is a view similar to Fig. 1 showing a tension member formed of braided wires.

As shown in the drawing, the principal characteristic of my invention is the provision of a tension member comprising a stranded wire, or a plurality of wires twisted or braided together. Such a tension member is shown in Fig. 1 as including two wires 10, 10ª twisted together to form a single tension member. In its broadest aspects, my invention contemplates the use of such a tension member, as shown in Fig. 1, as a reenforcing element in a tire bead. When this tension member is imbedded in the tire bead, the rubber thereof will adhere firmly to the twisted wire. In using a tension member as shown in Fig. 1, one or more turns or convolutions of the same may be used in the tire bead or, if desired, an annulus may first be formed, including as many turns as desired and then the completed annulus imbedded in the tire bead during the manufacture thereof.

Where more than one tension member is desired in the reenforcing element, a plurality of the same may be imbedded in a rubber tape 11, as shown in Figs. 2 and 3. As here shown, four tension members, as shown in Fig. 1, are employed and the same are held in parallel relationship by the rubber tape 11 in which they are imbedded. This construction may be formed by the usual extrusion machine, or any other suitable device. The rubber 11 of the tape will adhere firmly to the tension members, such adhesion being increased by the twisted formation. The completed tape or reenforcing element is imbedded in the tire bead in the usual manner. In the form shown in Figs. 4 and 5, four tension members are held together by a fabric sheath 12 wrapped about the same, as shown. This sheath 12 serves to hold the tension members in parallel relationship, and the same is preferably made of fabric impregnated with rubber. When the completed reenforcing element is imbedded in a tire bead, the rubber of the bead will adhere to the sheath 12 and more or less may be forced through the same. In any event, the sheath 12 will be forced in, around and between the twisted wires to cause a firm lodgment of the wires and the completed element in the tire bead.

Fig. 6 is a view showing a single tension member formed of three wires braided together. The member here shown resembles the tension member shown in Fig. 1, except that the wires are braided instead of twisted. It is to be understood that the tension member shown in Fig. 6 is adapted to the same uses as the one shown in Fig. 1. Also, where more than one tension member is desired in the reenforcing element, a plurality of tension members, such as shown in Fig. 6, may be used in the same way as disclosed in Figs. 2, 3, 4 and 5, and suitably imbedded, covered or encased, as described in connection with such figures.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A tire bead reenforcing element including a plurality of separate parallel tension members each composed of a plurality of wires twisted tightly together throughout their length, said members being wholly disconnected by cross wires and imbedded in a substance to which rubber will adhere, said substance serving to hold said members in parallel spaced relationship.

2. A tire bead reenforcing element comprising a closely spaced group of parallel tension members each composed of a plurality of wires twisted together throughout their length, said members being imbedded in a substance to which rubber will adhere and therewith constituting a flat tape structure.

In witness whereof, I have hereunto set my hand this 20th day of December, 1930.

ALFRED H. JOHNSON.